(No Model.) 2 Sheets—Sheet 1.

P. ARBOGAST.
MANUFACTURE OF GLASSWARE.

No. 260,819. Patented July 11, 1882.

WITNESSES:
John Cunningham
T. J. Patterson

Philip Arbogast, INVENTOR,
By Connolly Bros & McTighe
ATTORNEYS.

(No Model.) 2 Sheet

P. ARBOGAST.
MANUFACTURE OF GLASSWARE.

No. 260,819. Patented July 11

WITNESSES:
John Cunningham
T. J. Patterson

Philip Arbogast, INV
by Connolly Bros & M

UNITED STATES PATENT OFFICE.

PHILIP ARBOGAST, OF PITTSBURG, PENNSYLVANIA.

MANUFACTURE OF GLASSWARE.

SPECIFICATION forming part of Letters Patent No. 260,819, dated July 11, 1882.

Application filed August 11, 1881. (No model.)

*To all whom it may concern:*

Be it known that I, PHILIP ARBOGAST, of Pittsburg, in the county of Allegheny and State of Pennsylvania, have invented certain new and useful Improvements in the Manufacture of Glassware; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical section of my preparing-press. Fig. 2 is a similar view of the mold with a bottle in the act of finishing. Fig. 3 shows a form given by a modification of the preparing-press. Fig. 4 shows in section a rest for extra glass. Fig. 5 is a modification of Fig. 1. Figs. 6, 7, and 8 show different articles made by my invention.

This invention relates to the manufacture of such articles of glassware as are desired to be produced with a pressed or molded portion, generally the mouth, while the remainder is blown in a mold. Such articles are bottles, fruit-jars, lamp-chimneys, lantern-globes, lamp-bowls, &c.

In the manufacture of this class of articles the body is first blown in a mold after having been roughly shaped in the "marver." Then the article is clamped on a tool and softened at the mouth, after which it is given the desired finish with either a hand tool or press, in which operation some forms require the addition of a ring of extra glass to be stuck on. All these operations are laborious and costly and require skilled labor.

My invention consists broadly in pressing the finished portion in a suitable "gather," or lump of molten glass, and at the same time pressing a cavity in the lump or form to serve as a basis for the subsequent blowing, then removing the lump from the press-mold, placing it in a separate mold, and blowing till the lump has expanded to the form of the mold; also, in the apparatus hereinafter fully described and claimed.

In the drawings, A designates a two-part press-mold of cylindrical form and calculated to contain sufficient glass to form the body of a bottle of any given size.

B is a two-part ring, having a central opening conforming exactly to the shape of the bottle-neck as it is required to be finished. It has the dependent annulus or flange $a$, corresponding on its under surface with the shoulder of the bottle.

A lump of hot glass is inserted or dropped into the press-mold A and the ring B placed in position and closed. Then a plunger, C, is forced down into the ring and mold and quickly withdrawn, its thrust forcing the soft glass to assume the form given by the said ring and mold, thus producing a finished bottle-neck with a depending hollow mass of glass. As quickly as possible, and while the mass is still hot and soft, the mold A is opened and the mass lifted out, with the ring B still on it, (the ring having a suitable handle or handles for the purpose,) and lowered into a bottle-mold, D, Fig. 2. Then a blow-pipe, E, is inserted at the bottle-neck and the mass blown out till it fills the mold D, which finishes the operation. It requires no skilled labor and is exceedingly rapid. After finishing in this way, upon opening the mold D and ring B the bottle may be removed and at once placed in the annealing-oven.

In small articles—such as "prescription-bottles"—the process can be readily carried out by giving the preparatory mold A, ring B, and plunger C the form shown in Fig. 5. For such articles as have a small neck or mouth and a very large body I would form the neck, as in Fig. 3, with a thin small body under it, and then insert it into a larger and hotter mass, F, Fig. 4, and proceed as before described.

The object of the extension of the plunger into the dependent mass of glass is not only to force the glass into all parts of the ring and preparatory mold, but also to form a wind-cavity in the mass, which will materially help the blowing in the finishing-mold.

In Fig. 6 I show a crimped and beaded chimney, the crimped top and bead being pressed (like the bottle-neck) and the body blown in a mold, as before described. In this case, and in all articles having an open bottom, there will be a "blow-over," which must be broken off and ground.

Figure 1:
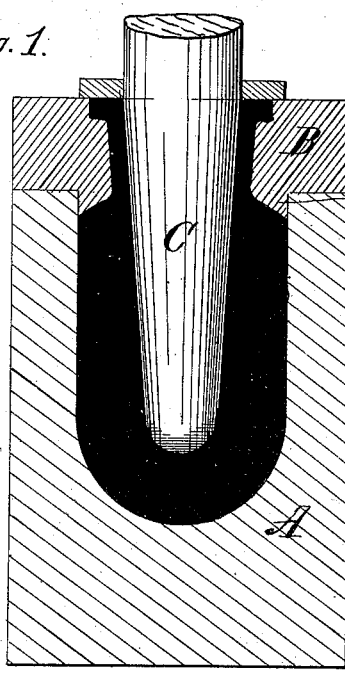
Figure 2:
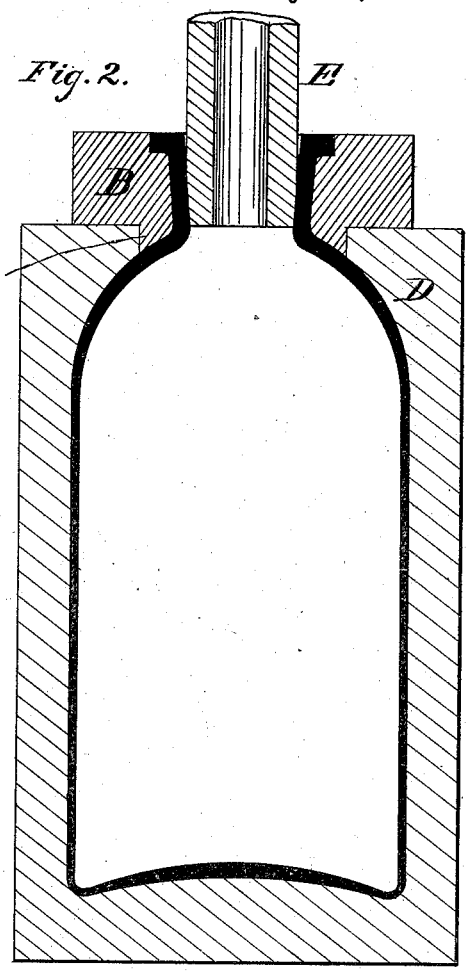
Figure 3:
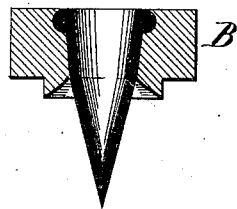
Figure 4:
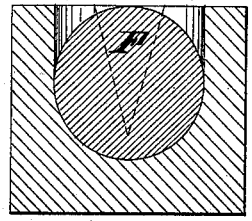
Figure 5:
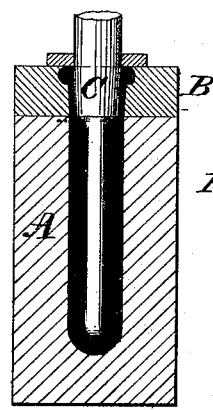
Figure 6:
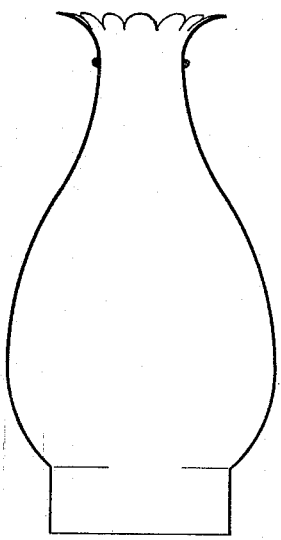
Figure 7:
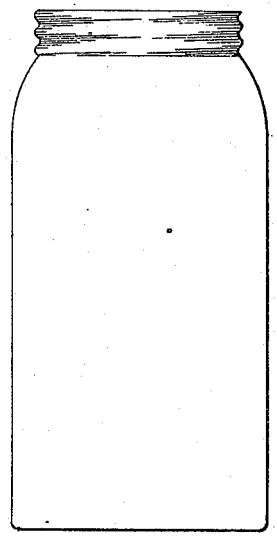
Fig. 7 shows a "screw-top" fruit-jar, which can be readily made by my process, the ring B in this case having the thread on its inner surface.
Figure 8:
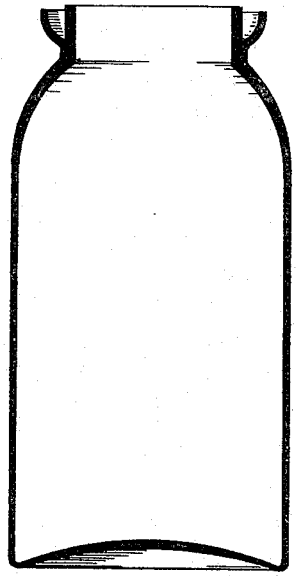
Fig. 8 shows a "grooved-ring" fruit-jar made by my process, the plunger in this case having a shouldered extension to form the grooved top in the ring B. Many other articles may be made in like manner; but it is not necessary to mention all of them.

It may in some cases be found advisable to reheat the dependent mass before blowing finally, which will be done without removing the ring; or the ring may be removed too.

The particular form of apparatus may be changed or modified without departing from the spirit of my invention. I therefore do not confine myself to the exact forms shown.

It is essential to the successful practice of the above invention that the plunger should be very quickly removed from the press-mold, as otherwise either the plunger will get heated and adhere to the glass, or, if cool, will chill the glass and preclude the possibility of subsequent blowing. It is equally essential that two separate and distinct molds be used, one for the pressing and one for the blowing, because the moment the gather is pressed not only the plunger must be removed, but the gather must also be removed from its mold, as, if it be allowed to remain there, its outer surface becomes chilled from contact with the mold and cannot be expanded or shaped further by blowing; so that unless the gather is thus removed from contact with both plunger and press-mold and placed in a separate mold for blowing it is impossible to produce the finished ware.

I am aware that it has been proposed to press the article in a mold which finishes one part of the same, and then, while the article is still in the same mold, to blow the remainder of the article, a part of the mold being enlarged for such blowing, and the air passing through the plunger into the body of the article. I do not claim such process; but

What I claim as my invention is-

The described improvement in the manufacture of glassware, consisting in pressing the mouth or neck to finished form with a dependent mass of glass, then withdrawing the plunger, then removing the article from the press-mold, and finally inserting it in a separate mold and blowing to form the body, substantially as described.

In testimony that I claim the foregoing as my own I have hereto affixed my signature in presence of two witnesses.

PHILIP ARBOGAST.

Witnesses:
 THOS. J. McTIGHE,
 A. V. D. WATTERSON.